Dec. 15, 1925.
E. D. TILLYER ET AL
1,566,050
NEUTRALIZING SET
Filed Dec. 27, 1921
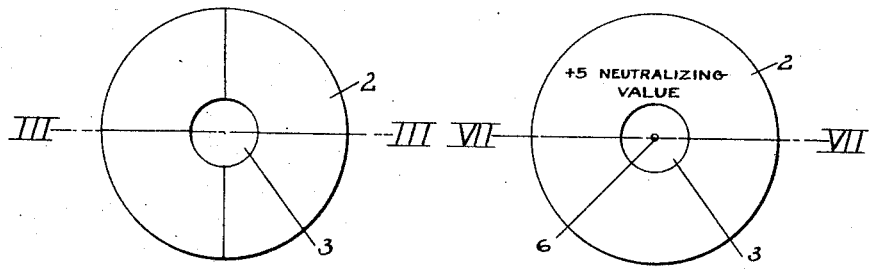
FIG. I  FIG. II
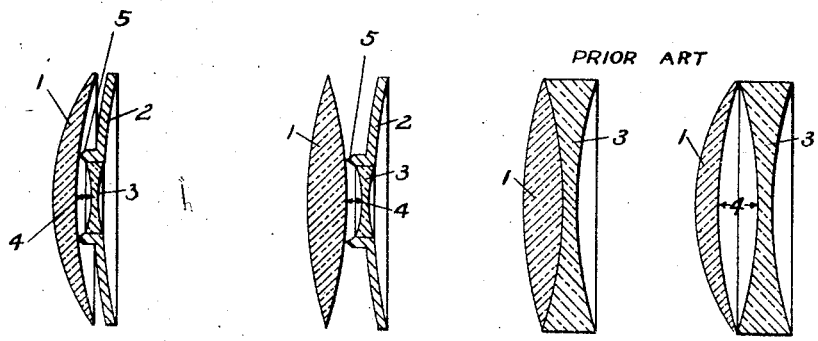
FIG. III  FIG. IV  FIG. V  FIG. VI
PRIOR ART
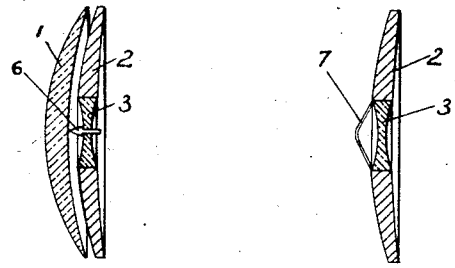
FIG. VII  FIG. VIII
INVENTOR
EDGAR D. TILLYER
HARRY W. HILL
BY
ATTORNEYS.

Patented Dec. 15, 1925.

1,566,050

UNITED STATES PATENT OFFICE.

EDGAR D. TILLYER AND HARRY W. HILL, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

NEUTRALIZING SET.

Application filed December 27, 1921. Serial No. 524,999.

*To all whom it may concern:*

Be it known that we, EDGAR D. TILLYER and HARRY W. HILL, citizens of the United States, residing at Southbridge, in the county of Worcester and State of Massachusetts, have invented certain new and useful Improvements in Neutralizing Sets, of which the following is a specification.

This invention relates to improvements in neutralizing sets and has for its object the provision of an improved construction of lens forming a unit in a set of lenses for use in neutralization sets to properly determine the effective power of ophthalmic lenses.

One of the leading objects of the present invention is the provision of a construction of this sort capable of use in determining by neutralization the effective power of various shapes and forms of lenses; that is to say, both flat or double convex and double concave, and also meniscus and toric lenses.

Other objects and advantages of our improved construction should be readily apparent by reference to the following specification taken in connection with the accompanying drawings and it will be understood that we may make any modifications in the specific details of construction shown and described within the scope of the appended claims without departing from or exceeding the spirit of our invention.

Figure I represents a front view of one embodiment thereof.

Figure II represents a similar view of a different form.

Figure III represents a sectional view taken as on the line III—III of Figure I illustrating the construction there shown in use.

Figure IV represents a similar view illustrating the device in connection with a different shape of lens.

Figures V and VI represent sectional views illustrating the prior art method.

Figure VII represents a sectional view as on the line VII—VII of Figure II.

Figure VIII represents a sectional view of another modified form.

In the drawings, the numeral 1 designates a lens to be tested, while the numeral 2 designates as an entirety the holding frame for the neutralizing lens 3, for convenience of illustration the lens to be tested having been shown as a plus or positive lens, and the neutralizing lens being a minus or negative lens.

Prior to our invention it has been customary in the neutralization of lenses to employ the ordinary contrageneric trial set lenses in the manner idicated in Figure V, from which it will be seen that if the lens to be tested or neutralized to determine its power is a double convex lens that the corresponding double concave lens will then properly fit against the ocular side of the lens so that the parts are in contact and correct neutralization results. When, however, the lens 1 to be tested is of toric or meniscus form the ordinary trial set lens will engage it only at the outer edge, with the result that there is considerable separation as at 4 between the two lenses being tested. This results in errors in neutralization of a very appreciable amount. The only possible way of at all getting around this difficulty is by placing the neutralizing lens against the front surface of the lens to be tested. This, however, will in ordinary prescriptions frequently result in an error of from one-half to one diopter between the neutralized value of the lens measured against the front surface and the actual effective value of the lens as used before the eye, or as is sometimes termed, vertex refraction.

By our invention we are able to get away from these difficulties and errors and to neutralize the effective value of the lens and to determine just what that effective value is. This we accomplish by introducing a substantially constant known error into the neutralization and then calculate the neutralizing lenses to compensate for this error so that their actual powers are not the same contrageneric powers as the lens to be tested, but are of a different power which will, however, neutralize the predetermined effective power in the lens being tested. We then mark each of said lenses or the holders therefor with the neutralizing value of that particular lens, a feature in itself new, since lenses have hitherto been marked with their actual value and not with their neutralizing value.

The actual operation of our invention will perhaps be best understood by reference to Figures III and IV, in which it will be seen that the frame or holder 2 is provided with the forwardly projecting flange or ring 5 surrounding the neutralizing lens 3, and projecting a definite distance therefrom so that the lens 3 will always be separated by the space 4 from the surface of the lens being tested. We would call particular attention to the fact that the lens 3 is in this instance made relatively small in size so that whether the ring 5 be placed against a concave surface as shown in Figure III, or a convex surface as shown in Figure IV, there will be but slight variation in the space 4, an amount which will prove negligible in ordinary use. If, however, it is desired to have extreme accuracy in the neutralizing set we may make use of a structure such as shown in Figure VII for example, in which a contact pin 6 is employed at the center of the neutralizing lens so that the distance is always constant or make use of a curve or V-like frame wire 7 carried by the frame and curving forward and spaced a definite distance from the neutralizing lens. In any event the lens is tested in accordance with our new process, which consists in calculating a neutralizing lens for a given power as disposed a predetermined distance from the surface of the lens to be tested and positively holding the neutralizing lens at said predetermined distance during the testing operation.

We claim:

1. A device of the character described, comprising a frame having a central aperture, a lens mounted in said aperture, said lens being calculated for the neutralization of a lens to be tested at a definite separation, and a forwardly projecting flange encircling the aperture and adapted to contact the surface of the lens under test whereby to hold the two lenses in the desired spaced relation.

2. A device of the character described comprising a test lens determined for neutralization at a desired separation from a lens to be tested and a member projecting from the test lens adapted to engage the lens to be tested whereby the two lenses are held at the required separation.

In testimony whereof we have affixed our signatures.

EDGAR D. TILLYER.
HARRY W. HILL.